(12) United States Patent  
Sato

(10) Patent No.: US 7,710,473 B2  
(45) Date of Patent: May 4, 2010

(54) SMEAR-CORRECTIVE DEVICE

(75) Inventor: Yoshihiro Sato, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 674 days.

(21) Appl. No.: 11/546,424

(22) Filed: Oct. 12, 2006

(65) Prior Publication Data

US 2007/0085919 A1    Apr. 19, 2007

(30) Foreign Application Priority Data

Oct. 13, 2005   (JP)   ............ P2005-298553

(51) Int. Cl.
*H04N 9/64* (2006.01)
(52) U.S. Cl. .................................... 348/249
(58) Field of Classification Search ............. 348/248, 348/249
See application file for complete search history.

(56) References Cited

U.S. PATENT DOCUMENTS

| | | | | |
|---|---|---|---|---|
| 4,581,651 A | * | 4/1986 | Miyata et al. | 348/249 |
| 5,089,894 A | * | 2/1992 | Higashitsutsumi | 348/249 |
| 6,809,763 B1 | * | 10/2004 | Yoshida | 348/248 |
| 7,218,351 B2 | * | 5/2007 | Miyahara et al. | 348/313 |
| 7,545,420 B2 | * | 6/2009 | Kondo | 348/248 |

FOREIGN PATENT DOCUMENTS

| JP | 7-67038 A | 3/1995 |
|---|---|---|
| JP | 2000-50165 A | 2/2000 |

* cited by examiner

*Primary Examiner*—Justin P Misleh
(74) *Attorney, Agent, or Firm*—Birch, Stewart, Kolasch & Birch, LLP.

(57) ABSTRACT

A smear-correcting device that corrects a smear of an image signal from a CCD having photoelectric conversion elements including a smear-correcting photoelectric conversion element, is provided and includes: a determining section determining whether a smear component is contained in an image signal from the photoelectric conversion elements other than the smear-correcting photoelectric conversion element, based on a corresponding smear-correcting signal from the smear-correcting photoelectric conversion element; a section correcting the smear of the image signal determined to contain the smear component, based on the corresponding smear-correcting signal; and an output section that outputs an image signal. When the determining section determines that the image signal contains a smear component, the output section outputs the image signal after correcting a smear of the image signal, and when the determining section determines that the image signal does not contains the smear component, the output section outputs the image signal without smear correction.

1 Claim, 3 Drawing Sheets

SMEAR-CORRECTIVE DEVICE

BACKGROUND OF THE INVENTION

1. Field of the Invention

The present invention relates to a smear-correcting device that corrects a smear of an image signal obtained from a CCD imaging device having a plurality of photoelectric conversion elements including a smear-correcting photoelectric conversion element.

2. Description of Related Art

It is a practice in the related art to correct a smear of an image signal obtained from a CCD imaging device as in the following manner. Namely, the image signal of a plurality of lines, obtained from smear-correcting photoelectric conversion elements of the imaging device, is averaged over on a column-by-column basis, to determine an average value per line. The average value per line is subtracted from an image signal of one line obtained from the other photoelectric conversion elements than the smear-correcting photoelectric conversion elements of the imaging device. (See, for example, JP-A-2000-50165 and JP-A-7-67038.)

However, in the smear correction, the average value is subtracted even from an image signal in which a smear component is not contained. In high-sensitivity photography, this deteriorates the S/N ratio in the signal, in which no smear components are contained, among the image signals obtained from the smear-correcting photoelectric conversion elements, and when noise components is contained in the image signal obtained from the smear-correcting photoelectric conversion elements, a vertical line takes place where no smears are occurring in an image corrected for smear.

For eliminating such a vertical line, it is effective to remove noise components by making a coring-subtraction of such an average value. However, of the image signals obtained from the smear-correcting photoelectric conversion elements, the signal containing a smear component is less deteriorated in its S/N ratio. In case coring-subtraction is made on those under the same condition as that of the signal not containing smear components, the signals containing smear components have a reduced average value which is insufficient in correcting, for smear, the region where smear is occurring.

SUMMARY OF THE INVENTION

An object of an illustrative, non-limiting embodiment of the invention is to provide a smear-correcting device capable of making a smear correction while preventing the occurrence of a vertical line in an imaging device region where no smears are occurring.

According to one aspect of the invention, there is provided a smear-correcting device that corrects a smear of an image signal from a CCD imaging device, the CCD imaging device having a plurality of photoelectric conversion elements including a smear-correcting photoelectric conversion element, the smear-correcting device including: a determining section that determines whether a smear component is contained in an image signal from each of the photoelectric conversion elements other than the smear-correcting photoelectric conversion element, based on a corresponding smear-correcting signal that is an image signal from the smear-correcting photoelectric conversion element corresponding to the each of the photoelectric conversion elements; a smear-correcting section that corrects a smear of the image signal determined to contain the smear component, based on the corresponding smear-correcting signal; and an output section that outputs an image signal, wherein when the determining section determines that the image signal contains a smear component, the output section outputs the image signal after the smear-correcting section corrects a smear of the image signal, and when the determining section determines that the image signal does not contains the smear component, the output section outputs the image signal without smear correction.

In one aspect of the invention, the smear-correcting device further includes: a plurality of smear-correcting photoelectric conversion elements corresponding to each of the photoelectric conversion elements, and an averaging section that calculates an average value over a plurality of corresponding smear-correcting signals form the plurality of the smear-correcting photoelectric conversion elements, wherein the determining section determines whether the image signal from the each of the photoelectric conversion elements contains a smear component when the average value is greater than a threshold.

In one aspect of the invention, the smear-correcting device further includes a signal generating section that generates a smear-correcting signal for correcting a smear component of the image signal based on the average value when the determining section determines that the image signal contains a smear component, wherein only when the determining section determines that the image signal contains the smear component, the smear correcting section correct a smear of the image signal based on the smear-correcting signal.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiment thereof, the following exemplary embodiment and its modification do not restrict the invention.

According to an exemplary embodiment, a smear-correcting device, capable of correcting a smear of an image while preventing a vertical line from occurring in a region thereof where smear is not occurring, can be provided.

With reference to the drawings, description is now made below on an exemplary embodiment according to the invention.

Figure 1:
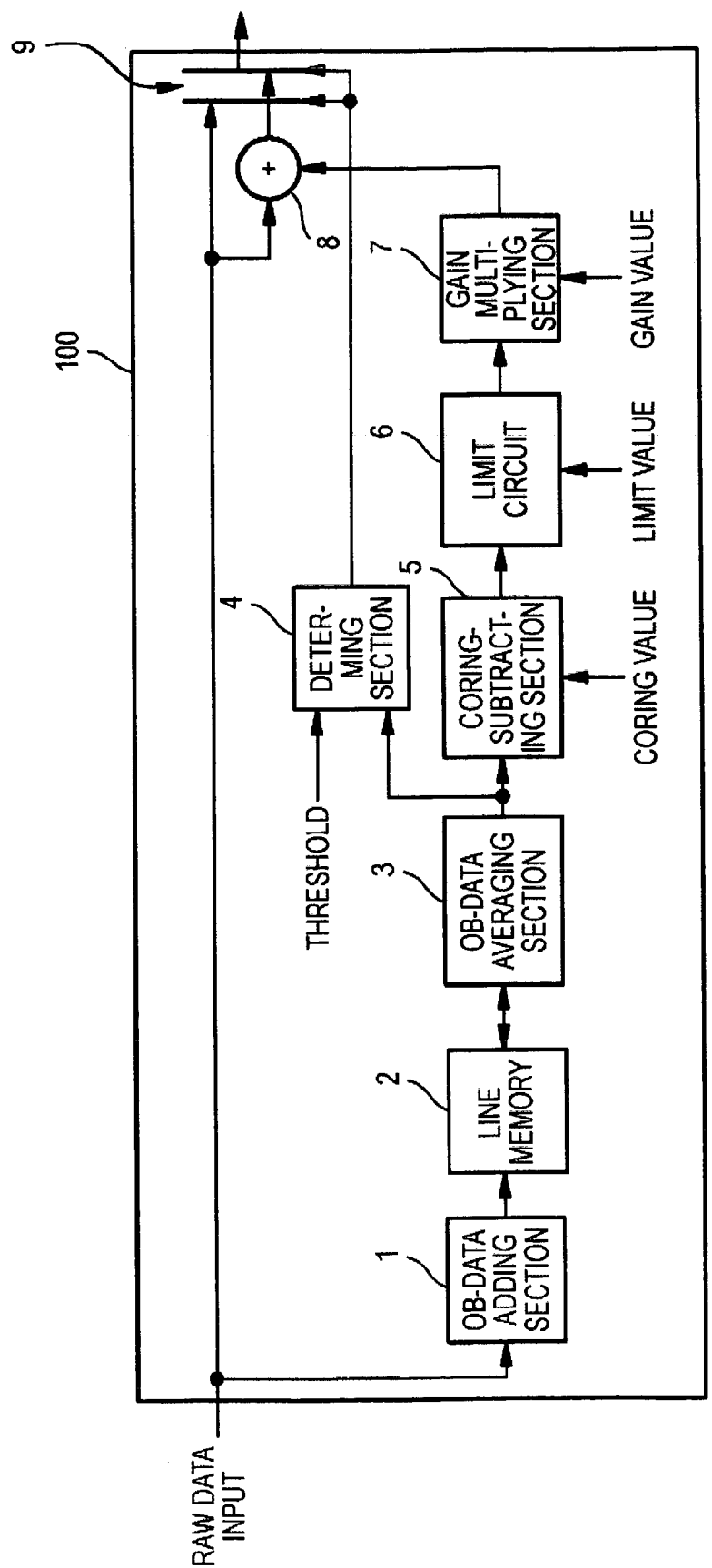
FIG. 1 is a diagram showing a schematic configuration of a smear-correcting device for explaining an exemplary embodiment according to the present invention.
Figure 2:
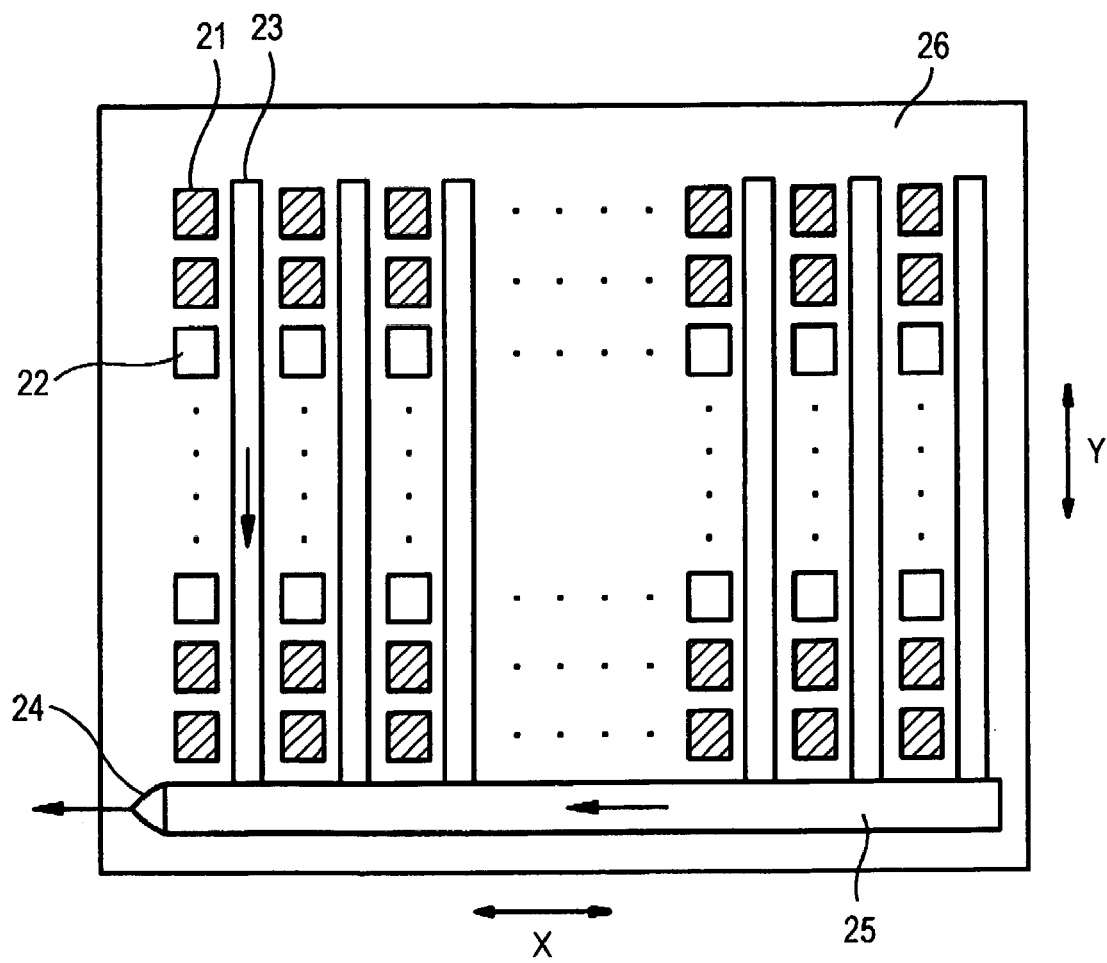
FIG. 2 is a plan view showing a schematic structure of a solid-state imaging device that outputs image data to be corrected for smear by the smear-correcting device shown in FIG. 1.

FIG. 1 is a figure showing a schematic configuration of a smear-correcting device, for explaining an exemplary embodiment according to the invention. FIG. 2 is a plan view showing a schematic structure of a solid-state imaging device to output an image signal to be corrected for smear by the smear-correcting device shown in FIG. 1.

The solid-state imaging device, shown in FIG. 2, is to be mounted on a digital camera or the like. This has a plurality of photoelectric conversion elements (photoelectric conversion elements 21, 22) arranged in a matrix form in a row direction (X-direction in FIG. 2) of a semiconductor substrate 26 and in a column direction (Y-direction in FIG. 2) orthogonal to the row direction, a column-directional CCD (charge coupled device) 23 to transfer the charge stored on the plurality of photoelectric conversion elements, a row-directional CCD 25 to transfer in a row direction the charge transferred from the column-directional CCD, and an output amplifier 24 to output an image signal commensurate with the charge transferred from the row-directional CCD 25.

The plurality of photoelectric conversion elements are arranged in a plurality of rows, in a column direction, each having a plurality of photoelectric conversion elements arranged in a row direction, or arranged in a plurality of columns, in a row direction, each having a plurality of photoelectric conversion elements arranged in a column direction. Incidentally, the photoelectric conversion elements in plural may be in a honeycomb arrangement without limited to the matrix arrangement.

The photoelectric conversion elements 22, for generating an image, are to generate and store a charge in an amount commensurate with the incidence of light.

The occurrence of smear is on the same column. In order to correct a smear of the image signal obtained from the photoelectric conversion elements 22 included in the same column, there is a need to provide at least one smear-correcting photoelectric conversion element 21 corresponding to the photoelectric conversion elements on the row. The photoelectric conversion elements 21 are shaded to detect a black level. In the FIG. 2 example, the photoelectric conversion elements 21 are provided in the upper two lows on the semiconductor substrate 26 and in the lower two rows on the semiconductor substrate 26.

The image signal, outputted from the FIG. 2 solid-state imaging device, is subjected to an analog-signal processing in the digital camera and then converted into a digital signal that is so-called as a RAW data to be outputted to a digital processing section within the digital camera. The RAW data is data digitized remaining in a form of the image signal from the solid-state imaging device. The RAW data can be outputted to an exterior apparatus of the digital camera. From now on, the image data obtained and digitized from the photoelectric conversion element 21 is referred to as OB (optical black) data while the image signal obtained and digitized from the photoelectric conversion element 21 is referred to as image data.

An smear-correcting device 100, shown in FIG. 1, is provided in the digital signal processor but can be realized over a computer.

The smear-correcting device 100 has an OB-data adding section 1, a line memory 2, an OB-data averaging section 3, a determining section 4, a coring-subtracting section 5, a limit circuit 6, a gain multiplying section 7, a subtracting 8 and a selector 9. The OB-data averaging section 3 corresponds to an average-value calculating section. The coring-subtracting section 5, limit circuit 6 and gain multiplying section 7 corresponds to a signal generating section (a smear-correcting-signal generating section). The subtracting section 8 corresponds to a smear-correcting section. The selector 9 corresponds to an output section.

When inputted the OB data of 4 rows obtained from the photoelectric conversion element 21 to the smear-correcting device 100, the OB-data adding section 1 makes an addition of the OB data of four rows on a column-by-column basis.

The line memory 2 stores therein the OB data of one row added by the OB-data adding section 1.

The OB-data averaging section 3 divides the OB data of one row, stored in the line memory 2, by four, i.e. the number of lines related to the addition in obtaining the OB data, thereby calculating an average value over the OB data obtained from the photoelectric conversion elements 21 included in the column. When the image data obtained from a certain photoelectric conversion element 22 is inputted to the smear-correcting device 100, the OB-data averaging section 3 calculates an average value over the OB data obtained from the photoelectric conversion elements 21 corresponding to the relevant photoelectric conversion element and outputs a average value thus calculated to the determining section 4 and coring-subtracting section 5.

The coring-subtracting section 5 makes a subtraction of a coring value from the inputted OB-data average value and outputs a value thus obtained to the limit circuit 6.

The limit circuit 6 compares the inputted-OB-data average value with a limit value. When the OB-data average value is greater than the limit value, the limit circuit 6 makes a processing to suppress the OB-data average value to the limit value or lower, and outputs the processed OB-data average value to the gain multiplying section 7. When the OB-data average value is smaller than a limit value, the limit circuit 6 outputs the inputted OB-data average value as it is.

The gain multiplying section 7 makes a multiplication of a gain value on the inputted OB-data average value, and outputs a value thus obtained to the subtracting section 8.

The subtracting section 8 subtracts the OB-data average value, inputted from the gain multiplying section 7, from the image data inputted to the smear-correcting device 100, and corrects the smear of the image data, thereby outputting the image data thus corrected for smear to the selector 9.

The selector 9 holds the image data inputted to the smear-correcting device 100 and the smear-corrected image data outputted from the subtracting section 8, and outputs any one of image data in accordance with a selector signal sent from the determining section 4.

The determining section 4 determines whether or not a smear component is contained in the image data inputted to the smear-correcting device 100, and instructs the selector 9 whether to output either of the image data corrected for smear or the image data not corrected for smear, according to a determination result thereof.

Figure 3:
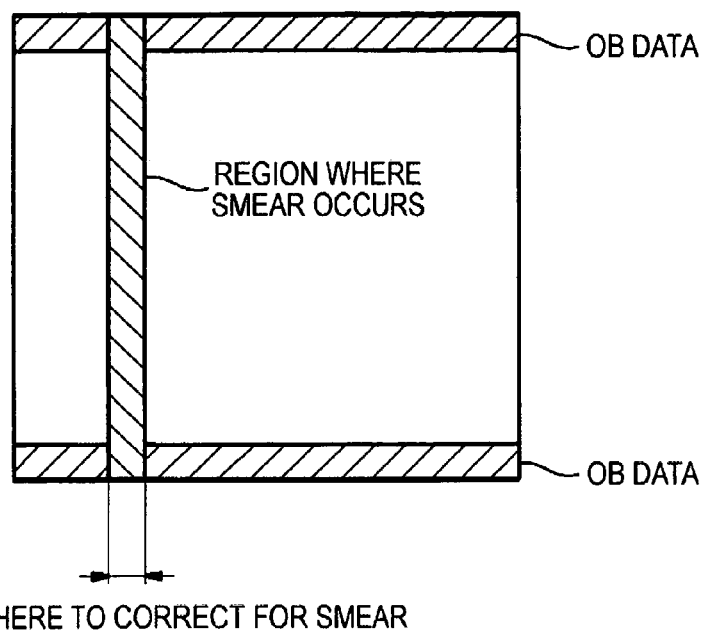
FIG. 3 is a view showing a concept of the RAW data outputted from an A/D converter of the solid-state imaging device.
Figure 4:
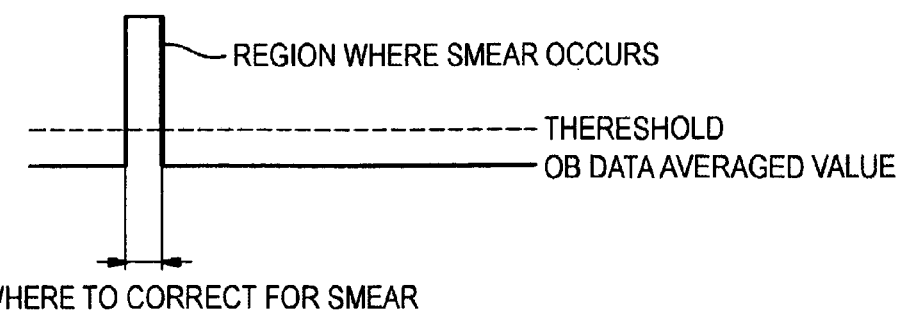
FIG. 4 is a view showing an average value over OB data.

FIG. 3 is a view showing a concept of the RAW data to be outputted from an A/D converter section of the solid-state imaging device. If assuming that a smear is taking places as shown in FIG. 3, it can be seen that the OB data, obtained from a column on which the smear is occurring, is greater in average value than the OB data obtained from another column as shown in FIG. 4. For this reason, by observing the average value over the OB data obtained from the photoelectric conversion elements 21 corresponding to the photoelectric conversion elements 22 which generated the inputted image data, it can be determined whether or not a smear component is contained in the relevant image data.

For this purpose, the determining section 4 compares the OB-data average value inputted from the OB-data averaging section 3 with the threshold. When the OB-data average value is greater than the threshold, the determining section 4 determines that the inputted image data contains a smear component and outputs a selector signal to the selector 9 so that it can output image data corrected for smear. Meanwhile, when the OB-data average value is equal to or smaller than the threshold, the determining section 4 determines that the inputted image data does not contain a smear component and outputs a selector signal to the selector 9 so that it can output image data not corrected for smear.

Description is now made on the operation of the smear-correcting device 100 configured as above.

At first, the OB data contained in RAW data is inputted from the solid-state imaging device to the OB-data averaging section 1 where the OB data obtained from the photoelectric conversion elements 21 is added together on a column-by-column basis and stored in the line memory 2. Then, image data input is started. When image data is inputted from a certain photoelectric conversion element 22, the image data is held on the selector 9. Simultaneously, based on the average value over the OB data obtained from the photoelectric conversion elements 21 (photoelectric conversion elements included in the column including the relevant photoelectric conversion element 22) corresponding to the relevant photoelectric conversion element 22, smear-correcting OB data is generated by the coring-subtracting section 5, limit circuit 6 and gain multiplying section 7. The generated OB data is subtracted from the inputted image data, to thereby hold smear-corrected image data on the selector 9. Meanwhile, the determining section 4 determines whether or not a smear component is contained in the inputted image data. When determined that a smear component is contained, the selector 9 is caused to output smear-corrected image data. When determined that a smear component is not contained, the selector 9 is caused to output the inputted image data as it is. The smear-correcting device 100 performs such a processing on every one of the image data obtained from the photoelectric conversion elements 22.

In this manner, according to the smear-correcting device 100, when a smear component is contained in the inputted image data, image data can be outputted which the smear component is subtracted from the image data. When a smear component is not contained in the inputted image data, the relevant image data can be outputted as it is. The image data, not containing a smear component, has not been corrected for smear, which can prevent a vertical line from occurring in a region where no smears are occurring. In addition, according to the smear-correcting device 100, coring subtraction is made on each average value over the OB data corresponding to the inputted image data. This makes it possible to optimally make a coring subtraction of the average value over the OB data containing a smear component, thus effecting a smear correction to a full extent.

Incidentally, in the smear-correcting device 100, each time image data is inputted, smear correction is made on the image data. However, this is not limitative. For example, the coring-subtracting section 5, the limit circuit 6, the gain multiplying section 7 and the subtracting section 8 may be operated only when inputted image data is determined containing a smear component. By doing so, smear correction can be made only on the image data containing a smear component thus reducing consumption power. As described before, each time image data is inputted, it is possible to perform simultaneously a determination as to whether or not the image data contains a smear component and a smear correction in the case the image data is corrected for smear. This can reduce the time of processing.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2005-298553, filed Oct. 13, 2005, the entire disclosure of which is herein incorporated by reference.

What is claimed is:

1. A smear-correcting device that corrects a smear of an image signal from a CCD imaging device, the CCD imaging device comprising a plurality of photoelectric conversion elements including a smear-correcting photoelectric conversion element, the smear-correcting device comprising:

a determining section that determines whether a smear component is contained in an image signal from each of the photoelectric conversion elements other than the smear-correcting photoelectric conversion element, based on a corresponding smear-correcting signal that is an image signal from the smear-correcting photoelectric conversion element corresponding to the each of the photoelectric conversion elements;

a smear-correcting section that subtracts the corresponding smear-correcting signal from the image signal determined to contain the smear component to correct a smear of the image signal; and an output section that outputs an image signal, wherein when the determining section determines that the image signal contains a smear component, the output section outputs the image signal after the smear-correcting section corrects a smear of the image signal, and when the determining section determines that the image signal does not contains the smear component, the output section outputs the image signal without smear correction;

a plurality of smear-correcting photoelectric conversion elements corresponding to each of the photoelectric conversion elements, and an averaging section that calculates an average value over a plurality of corresponding smear-correcting signals form the plurality of the smear-correcting photoelectric conversion elements, wherein the determining section determines whether the image signal from the each of the photoelectric conversion elements contains a smear component when the average value is greater than a threshold;

a signal generating section that generates a smear-correcting signal for correcting a smear component of the image signal based on the average value when the determining section determines that the image signal contains a smear component, wherein only when the determining section determines that the image signal contains the smear component, the smear correcting section correct a smear of the image signal based on the smear-correcting signal, wherein the signal generating section includes:

a coring-subtracting section that subtracts a coring values from the average value to output a coring-subtracted value;

a limit circuit that compares the coring-subtracted value with a limit value, wherein when the coring-subtracted value is greater than the limit value, the limit circuit suppresses the output to a suppressed value, and when the coring-subtracted value is smaller than the limit value, the limit circuit outputs the coring-subtracted value; and a gain multiplying section that multiplies a gain value with the suppressed value or the coring-subtracted value from the limit circuit to output the smear-correcting signal.

* * * * *